(12) United States Patent
Corda et al.

(10) Patent No.: US 8,725,211 B2
(45) Date of Patent: May 13, 2014

(54) TRUSTED SERVICE MANAGER MANAGING REPORTS OF LOST OR STOLEN MOBILE COMMUNICATION DEVICES

(75) Inventors: Alexandre Corda, Vienna (FR); Ismaila Wane, Vienna (FR)

(73) Assignee: Gemalto SA, Meudon (FR)

( * ) Notice: Subject to any disclaimer, the term of this patent is extended or adjusted under 35 U.S.C. 154(b) by 866 days.

(21) Appl. No.: 12/680,717

(22) PCT Filed: Sep. 22, 2008

(86) PCT No.: PCT/IB2008/053828
§ 371 (c)(1),
(2), (4) Date: Sep. 23, 2010

(87) PCT Pub. No.: WO2009/040714
PCT Pub. Date: Apr. 2, 2009

(65) Prior Publication Data
US 2011/0034160 A1     Feb. 10, 2011

(30) Foreign Application Priority Data
Sep. 27, 2007   (EP) ..................................... 07291155

(51) Int. Cl.
*H04B 1/38*      (2006.01)
*H04M 1/00*     (2006.01)
(52) U.S. Cl.
USPC ......................................................... 455/558
(58) Field of Classification Search
USPC .......................................................... 455/558
See application file for complete search history.

(56) References Cited

U.S. PATENT DOCUMENTS

| | | | |
|---|---|---|---|
| 5,594,227 A | 1/1997 | Deo | |
| 7,191,179 B2 * | 3/2007 | Shaw | ..................................... 1/1 |
| 2004/0192282 A1 * | 9/2004 | Vasudevan | .................... 455/419 |
| 2010/0291896 A1 | 11/2010 | Corda | |

FOREIGN PATENT DOCUMENTS

| | | |
|---|---|---|
| EP | 1248188 A | 10/2002 |
| EP | 1248188 A1 | 12/2009 |
| WO | WO01/18746 A1 | 3/2001 |
| WO | WO2005098769 A | 10/2005 |
| WO | WO2009060393 A2 | 11/2008 |

OTHER PUBLICATIONS

GSM Association,Title; Mobile NFC Services Version 1.0, Feb. 2007.*

(Continued)

*Primary Examiner* — Marisol Figueroa
(74) *Attorney, Agent, or Firm* — The Jansson Firm; Pehr B. Jansson

(57) ABSTRACT

A Trusted Service Manager (TSM) receives installation requests (INST) from Service Providers (SPx) comprising an application (APPx), a Service Provider identifier (SPx-ID) and an identifier (MOx-ID) of a target mobile communication device (MOx) that is equipped with a memory device (MIF) to store the application (APPx). The Trusted Service Manager (TSM) transmits the application (APPx) to the target mobile communication device (MOx) and keeps a repository (REP) of the received applications (APPx), their associated service provider identifiers (SPx-ID) and their associated target mobile communication device identifiers (MOx-ID). If the Trusted Service Manager (TSM) receives queries (QU) from a Mobile Network Operator (MNO) asking for the Service Providers associated with a specific mobile communication device identifier (MOx-ID) it retrieves from the repository (REP) those Service Providers (SPx) that are associated with the queried mobile communication device identifier (MOx-ID).

10 Claims, 4 Drawing Sheets

(56) References Cited

OTHER PUBLICATIONS

Nordlund S: "Secure Over-The-Air Services in NFC Ecosystems" NFC Applications Conference, Mar. 20, 2007 Hagenberg, Austria, [Online] XP002470503 www.nfc-research.at/fileadmin/congress/.../05_Venyon_Sirpa_Nordlund.pdf.
PCT/IB2008/053828 International Search Report Dec. 22, 2008, whole document. European Patent Office, P.B. 5818 Patentlaan 2 NL-2280 HV Rijswijk.
Norlund S: "Secure Over-The-Air Services in NFC Ecosystems" NFC Applications Conference Hagenberg, Mar. 20, 2007, XP002470503, pp. 11,18,19,22,23.
PCT/IB2008/054613 International Search Report, Apr. 22, 2009, European Patent Office, P.B. 5818 Patentlaan 2 NL-2280 HV Rijswijk.
GSMA: "mobile NFC technical guidelines—Version 2.0" Internet Citation, [Online] Nov. 1, 2007, pp. 1-95, XP002495767 Retrieved from the Internet: URL:http://www.gsmworld.com/documents/nfc/gsma_nfc2_wp.pdf> [retrieved on Sep. 9, 2008] p. 4, line1—p. 6, last line. p. 29, line 1—p. 35, last line. Figures 1, 10-12.

\* cited by examiner

Fig. 1
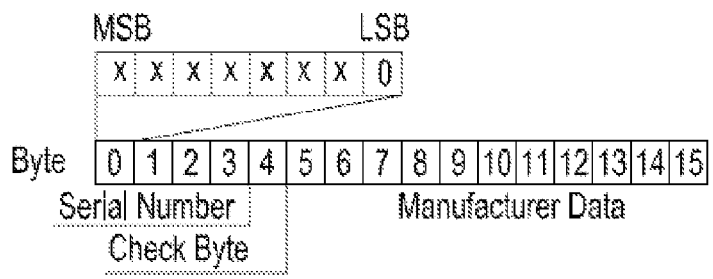
Fig. 2
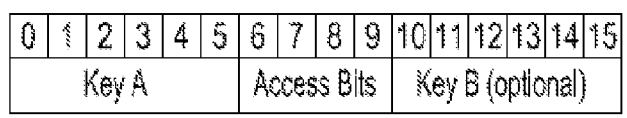
Fig. 3

TRUSTED SERVICE MANAGER MANAGING REPORTS OF LOST OR STOLEN MOBILE COMMUNICATION DEVICES

FIELD OF THE INVENTION

The invention relates to a Trusted Service Manager being adapted to receive installation requests from Service Providers via a first communication channel, said installation requests comprising an application, a Service Provider identifier of the Service Provider and a unique identifier, e.g. a telephone number, of a target mobile communication device being equipped with a memory device to store the application; and to transmit the application contained in the installation request via a second communication channel, particularly an Over-the-Air Service of a Mobile Network Operator to the target mobile communication device.

BACKGROUND OF THE INVENTION

The MIFARE® classic family, developed by NXP Semiconductors is the pioneer and front runner in contactless smart card ICs operating in the 13.56 MHz frequency range with read/write capability. MIFARE® is a trademark of NXP Semiconductors. MIFARE complies with ISO14443 A, which is used in more than 80% of all contactless smart cards today. The technology is embodied in both cards and card reader devices. MIFARE cards are being used in an increasingly broad range of applications (including transport ticketing, access control, e-payment, road tolling, and loyalty applications). MIFARE Standard (or Classic) cards employ a proprietary high-level protocol with a proprietary security protocol for authentication and ciphering. MIFARE® technology has become a standard for memory devices with key-protected memory sectors. One example for a published product specification of MIFARE® technology is the data sheet "MIFARE® Standard Card IC MF1 IC S50—Functional Specification" (1998). MIFARE® technology is also discussed in: Klaus Finkenzeller, "RFID Handbuch", HANSER, $3^{rd}$ edition (2002).

The MIFARE Classic cards are fundamentally just memory storage devices, where the memory is divided into sectors and blocks with simple security mechanisms for access control. Each device has a unique serial number. Anticollision is provided so that several cards in the field may be selected and operated in sequence.

The MIFARE Standard 1k offers about 768 bytes of data storage, split into 16 sectors with 4 blocks of 16 bytes each (one block consists of 16 byte); each sector is protected by two different keys, called A and B. They can be programmed for operations like reading, writing, increasing value blocks, etc. The last block of each sector is called "trailer", which contains two secret keys (A and B) and programmable access conditions for each block in this sector. In order to support multi-application with key hierarchy an individual set of two keys (A and B) per sector (per application) is provided.

The memory organization of a MIFARE Standard 1k card is shown in FIG. 1. The 1024×8 bit EEPROM memory is organized in 16 sectors with 4 blocks of 16 bytes each. The first data block (block 0) of the first sector (sector 0) is the manufacturer block. It contains the IC manufacturer data. Due to security and system requirements this block is write protected after having been programmed by the IC manufacturer at production. The manufacturer block is shown in detail in FIG. 2.

Now referring again to FIG. 1 all sectors of the memory contain 3 blocks of 16 bytes for storing data (except sector 0 which contains only two data blocks and the read-only manufacturer block). These data blocks can be configured by the access bits as read/write blocks for e.g. contactless access control or value blocks for e.g. electronic purse applications, where additional commands like increment and decrement for direct control of the stored value are provided. The value blocks have a fixed data format which permits error detection and correction and a backup management. An authentication command has to be carried out before any memory operation in order to allow further commands.

Each sector of the memory further has it own sector trailer (see FIG. 3) containing the secret keys A and B (optional), which return logical "0"s when read and the access conditions for the four blocks of that sector, which are stored in bytes 6 . . . 9. The access bits also specify the type (read/write or value) of the data blocks. If key B is not needed, the last 6 bytes of block 3 can be used as data bytes.

MIFARE ICs are typically connected to a coil with a few turns and then embedded in plastic to form a passive contactless smart card. No battery is needed since the IC is supplied with energy from the field. When the card is positioned in the proximity of the reader antenna, the high speed RF communication interface allows to transmit data with 106 kBit/s. The typical operating distance of a MIFARE memory device is up to 100 mm (depending on antenna geometry). A typical ticketing transaction needs less than 100 ms (including backup management).

SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

The ability to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc. A true anticollision method (acc. ISO/IEC 14443-3), enables multiple cards to be handled simultaneously.

It should be noted that the emulation of MIFARE Classic cards is not only restricted to SmartMX cards, but there may also exist other present or future smartcards being able to emulate MIFARE Classic cards.

It should further be noted that the invention is not restricted to MIFARE technology, but also applies to other memory devices, particularly those that comprise a plurality of memory sectors wherein the sectors are protected against unauthorized access by sector keys.

Recently, mobile communication devices have been developed which contain memory devices having unique memory device identifications, like MIFARE devices, either being configured as MIFARE Classic cards or as MIFARE emulation devices like SmartMX cards. These mobile communication devices comprise e.g. mobile phones with Near Field Communication (NFC) capabilities, but are not limited to mobile phones.

In February 2007 the GSM Assocation (GSMA) published a white paper outlining operator community guidance for the eco-system parties involved in the development of Mobile NFC (Near Field Communication) services. Mobile NFC is defined as the combination of contactless services with mobile telephony, based on NFC technology. The mobile phone with a hardware-based secure identity token (the UICC) can provide the ideal environment for NFC applications. The UICC can replace the physical card thus optimising costs for the Service Provider, and offering users a more convenient service.

Various different entities are involved in the Mobile NFC ecosystem. These are defined below:

Customer—uses the mobile device for mobile communications and Mobile NFC services. The customer subscribes to an MNO and uses Mobile NFC services.

Mobile Network Operator (MNO)—provides the full range mobile services to the Customer, particularly provides UICC and NFC terminals plus Over The Air (OTA) transport services.

Service Provider (SP)—provides contactless services to the Customer (SPs are e.g. banks, public transport companies, loyalty programs owners etc.).

Retailer/Merchant—service dependent, e.g. operates a NFC capable Point of Sales (POS) terminal.

Trusted Service Manager (TSM)—securely distributes and manages the Service Providers' services to the MNO customer base.

Handset, NFC Chipset and UICC Manufacturer—produce Mobile NFC/Communication devices and the associated UICC hardware.

Reader Manufacturer—produces NFC reader devices.

Application developer—designs and develops the Mobile NFC applications.

Standardisation Bodies and Industry Fora—develop a global standard for NFC, enabling interoperability, backward compatibility and future development of NFC applications and services.

One of the key findings in said white paper is that Mobile NFC will be successful provided that the Mobile NFC ecosystem is steady, providing value for all entities within it; and is efficient, by introducing a new role of the Trusted Service Manager.

The role of the Trusted Service Manager (TSM) is to:

Provide the single point of contact for the Service Providers to access their customer base through the MNOs.

Manage the secure download and life-cycle management of the Mobile NFC application on behalf of the Service Providers.

The TSM does not participate in the transaction stage of the service, thus ensuring that the Service Providers' existing business models are not disrupted. Depending on the national market needs and situations, the TSM can be managed by one MNO, a consortium of MNOs, or by independent Trusted Third Parties. The number of operating TSMs in one market will depend on the national market needs and circumstances.

The present inventions applies to a Mobile NFC ecosystem with Trusted Service Manager (TSM) as disclosed in the above referenced GSMA white book. Particularly, it takes into account the specific role of the TSM which acts as the single point of contact for the Service Providers to access their customer base through the MNOs and manages the secure download and life-cycle management of the Mobile NFC application on behalf of the Service Provider. However, while the GSMA whitebook defines the role of the TSM in theory, for successful applications in practice there are still a couple of issues to be considered. For instance, when Service Providers intend to provide applications, particularly MIFARE applications (ticket issue, access control, coupon issue etc.) they prefer to transmit the application by SMS via the over-the-air (OTA) services of a Mobile Network Operator (MNO) to an NFC capable mobile phone being equipped with a memory device that comprises a plurality of key-protected memory sectors, particularly a MIFARE memory. In the NFC mobile phone the application has to be extracted from the SMS and has to be written either into (arbitrary) free memory sectors or into predefined sectors of a memory device that is specifically allocated to that particular application.

While the approach that the TSM is the only instance that controls the memory devices in mobile communication devices, particularly NFC mobile phones, brings about many advantages it has nevertheless also weak points. One of them is the fact that neither the Mobile Network Operator nor the Service Providers have full knowledge of what applications and services are installed in the mobile communication devices. When such a mobile communication device is reported as lost or stolen, the customer (who is the user and/or owner of this mobile communication device) wants to stop all applications and services (i.e. underground yearly pass, credit card and so on) installed in his device to hinder abuse of these services. In order to do this the customer has two choices: to contact his Mobile Network Operator and/or to contact all the Services Providers which have delivered the services and applications.

When being informed about a lost or stolen mobile communication device the Mobile Network Operator can discard the installed services on the mobile communication device but has no clue on how to stop the customer's registrations associated with the installed services.

When the customer intends to contact the Service Providers without having his mobile communication device at hand it could be difficult for him to remember what services have been installed and who are the Service Providers of these services.

OBJECT AND SUMMARY OF THE INVENTION

It is an object of the invention to provide a Trusted Service Manager of the type defined in the first paragraph in which the disadvantages defined above are avoided.

In order to achieve the object defined above, with a Trusted Service Manager according to the invention characteristic features are provided so that a Trusted Service Manager according to the invention can be characterized in the way defined below, that is:

A Trusted Service Manager being adapted/designed to:

receive installation requests from Service Providers via a first communication channel, said installation requests comprising an application, a Service Provider identifier of the Service Provider and a unique identifier, e.g. a telephone number, of a target mobile communication device being equipped with a memory device to store the application; transmit the application contained in the installation request via a second communication channel, particularly an Over-the-Air Service of a Mobile Network Operator to the target mobile communication device; keep a repository of information regarding the received applications, their associated service provider identifiers and their associated target mobile communication device identifiers; receive queries from a Mobile Network Operator via a third communication channel which queries ask for the Service Providers associated with a specific mobile communication device identifier and to process said queries by retrieving from the repository those Service Providers that are associated with the queried mobile communication device identifier.

The characteristic features according to the invention provide the advantage that by having a third party, i.e. the Trusted Service Manager, retrieved a full list of the Service Providers which have delivered services and applications to the mobile communication device the Service Providers and/or the customer can be informed accordingly so that appropriate measures can be taken to hinder abuse of the applications that are stored in his mobile communication device. It should be noted that the core aspect of the present invention is to provide information to the concerned parties about the applications and the Service Providers linked thereto, rather than describing disabling of the applications located in the mobile communication device. Another important aspect of the present invention is that the Service Providers only get information related to their applications, but do not get information about applications of other Service Providers which are also stored in the lost or stolen mobile communication device.

In one embodiment of the invention the Trusted Service Manager forwards a list of the retrieved Service Providers to the Mobile Network Operator which has sent the query. The advantage of this embodiment is that the customer only needs to inform the Mobile Network Operator about the loss of his mobile communication device and then the Mobile Network Operator will act as a "one stop shop" in order to carry out the necessary precautionary provisions.

In another embodiment of the invention the Trusted Service Manager itself sends a message containing the queried mobile phone identifier to all retrieved Service Providers. With this automatically generated messages the Service Providers are enabled to take the necessary decisions.

In yet another embodiment of the invention the Trusted Service Manager is adapted to forward a list of all retrieved Service Providers to the customer of the mobile phone. With this information the customer is enabled to consider which Service Providers have to be informed and which of them need not be informed.

The measures as claimed in claim 5 or claim 6, respectively, provide the advantage that they rely on well-defined highly accessible network infrastructures and services.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to them.

FIG. 1 shows the memory organization of a MIFARE Standard 1k EEPROM.

FIG. 2 shows the manufacturer block of a MIFARE memory.

FIG. 3 shows the sector trailer of a sector of a MIFARE memory.

DESCRIPTION OF EMBODIMENTS

Figure 4:
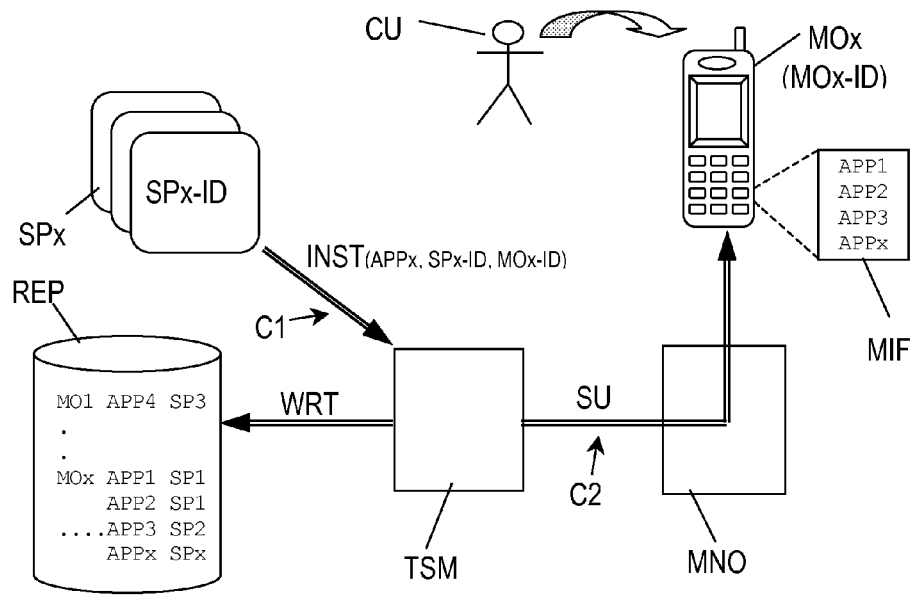
FIG. 4 shows a mobile NFC ecosystem with Trusted Service Manager in which environment the present invention is embedded.

FIG. 4 schematically shows a Mobile NFC ecosystem as disclosed in the above referenced GSMA white book. The system comprises a Mobile Network Operator MNO, a couple of Service Providers SPx (wherein the lower case letter 'x' stands for a number), mobile communication devices MOx (wherein the lower case letter 'x' stands for a number) and a Trusted Service Manager TSM. Each mobile communication device MOx is assigned to a customer CU who has registered the mobile communication device MOx at the Mobile Network Operator MNO. The Mobile Network Operator MNO provides the full range mobile services to the customers CU, particularly provides UICC and NFC terminals plus Over The Air (OTA) transport services for their mobile communication devices MOx. The mobile communication devices MOx are equipped with memory devices MIF being adapted to securely store applications (sometimes also called services) APP1, APP2, APP3 or generally designated as APPx. The memory device MIF advantageously comprises a MIFARE memory card (e.g. a MIFARE Standard 1k memory card as shown in FIG. 1) or a SmartMX card. The mobile communication devices MOx equipped with said memory devices MIF are preferably configured as NFC mobile phones. The applications APPx being stored in the memory devices MIF are provided by the Service Providers SPx. Service Providers SPx are e.g. banks, public transport companies, loyalty programs owners etc.

The Trusted Service Manager TSM securely distributes and manages the Service Providers' SPx applications APPx to the Mobile Network Operator's MNO customer base as will be explained in more detail below.

When a Service Provider SPx wants to install a new application APPx (ticket, access control, coupon, etc.) in a memory device MIF of a mobile communication device MOx it sends an installation request INST via a first communication channel C1 to the Trusted Service Manager TSM. The installation request INST comprises the application APPx to be installed, a Service Provider identifier SPx-ID of the Service Provider who sends the installation request INST and a unique identifier MOx-ID, e.g. an assigned telephone number, of a target mobile communication device MOx being equipped with a memory device MIF. The first communication channel C1 is e.g. configured as a computer network such as the Internet. In the present example the preferred data transmission protocol between the Service Provider SPx and the Trusted Service Manager TSM is HTTPS. Usually, the Service Provider SPx has got the unique identifier MOx-ID of the mobile communication device MOx directly from the customer CU, e.g. when he orders a ticket via the website of the Service Provider SPx and in order to complete this order has to input the telephone number of his mobile communication device MOx into an online-form.

As the Trusted Service Manager TSM receives the installation request INST from the Service Provider SPx it extracts the application APPx and the mobile communication device identifier MOx-ID of the mobile communication device MOx and—provided that the memory device MIF of the mobile communication device MOx is a MIFARE memory—assigns under its own discretion one or more destination sectors and the associated sector key(s) (key A or B, see FIG. 1) of the memory device MIF. Next, the Trusted Service Manager TSM compiles the application APPx, the sector key(s) and the sector number(s) of the destination sectors into a setup-message SU. In order to improve security the Trusted Service Manager TSM may encrypt the setup-message SU. Then the Trusted Service Manager TSM sends the setup-message SU via a second communication channel C2, e.g. an over-the-air (OTA) service of the Mobile Network Operator MNO to the mobile communication device MOx. Presently, the preferred OTA service is SMS. In the mobile phone MOx there is a software application running being designed to extract all the data from the received setup-message SU, if necessary decrypting it first, and writing the extracted application APPx into the assigned destination sector(s) of the memory device MIF by using the extracted sector key(s).

According to the present invention, as the Trusted Service Manager TSM receives the installation request INST from the Service Provider SPx and extracts the application APPx and the mobile communication device identifier MOx-ID of the mobile communication device MOx it further writes (WRT) these data into a repository REP so that it can retrieve all Service Providers SPx that are associated with a specific mobile communication device identifier MOx-ID. The repository REP shown in FIG. 4 contains as a simplified example one application APP4 assigned to a NFC mobile phone (MO1) which application APP4 has been delivered by a third Service Provider SP3, two applications APP1, APP2 which have been delivered by a first Service Provider SP1 to the mobile communication device MOx and a third application APP3 which has been delivered by a second Service Provider SP2 to the mobile communication device MOx. Further, another application APPx originating from another Service Provider SPx is also assigned to the mobile communication device MOx. The repository REP could for instance be configured as a data base, a file system or the like.

Figure 5:
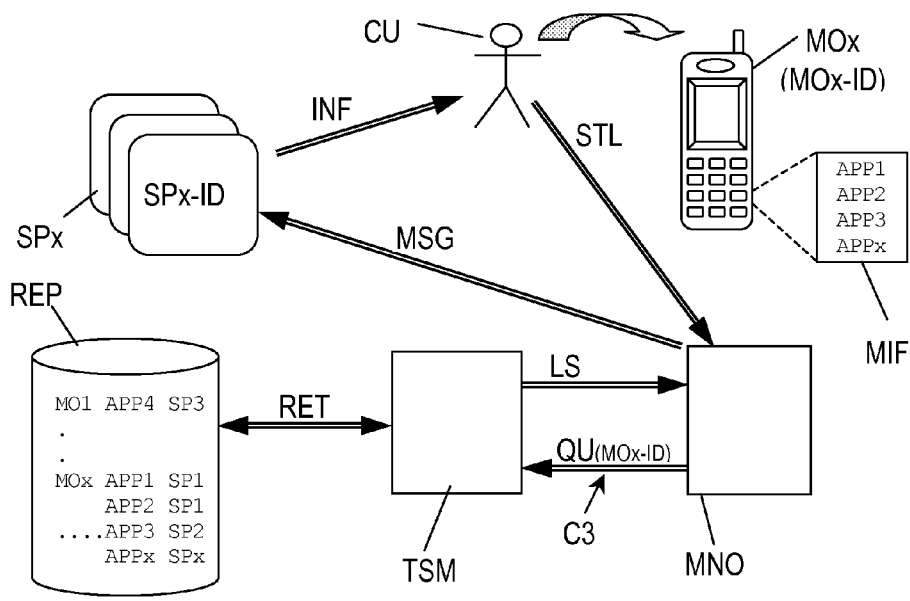
FIG. 5 shows a process flow in the mobile NFC ecosystem according to a first embodiment of the invention.

Now turning to FIG. 5 a first embodiment of the invention is explained. Provided that the customer CU has realized that his mobile communication device MOx has been lost or stolen he sends a report STL (by telephone, e-mail or whatsoever) of his loss to the Mobile Network Operator MNO. Since the customer CU has been registered with the Mobile Network Operator MNO it has all necessary information about the customer CU, his lost mobile communication device MOx and the assigned mobile communication device identifier MOx-ID in its customer base. Now the Mobile Network Operator MNO sends a query QU via a third communication channel C3 to the Trusted Service Manager TSM including the identifier MOx-ID of the lost mobile communication device MOx in this query QU. The query QU asks the Trusted Service Manager TSM for all Service Providers SPx that have been associated with the lost mobile communication device MOx or in other words with its mobile communication device identifier MOx-ID. The Trusted Service Manager TSM processes this query QU by retrieving (RET) from its repository REP all Service Providers SPx that are associated with the queried mobile communication device identifier MOx-ID. Next, the Trusted Service Manager TSM replies to the query of the Mobile Network Operator MNO with a complete list LS of the retrieved Service Providers SPx. With this list LS the Mobile Network Operator MNO is in a position to send a message MSG to each of the Service Providers SPx contained in the list LS and to warn them about the lost/stolen mobile communication device MOx. If necessary each warned Service Provider SPx will contact (INF) the customer CU to carry out actions on the registration of the customer CU. Actions could be cancellation, report on another mobile telephone, freeze of the registration and so on.

Figure 6:
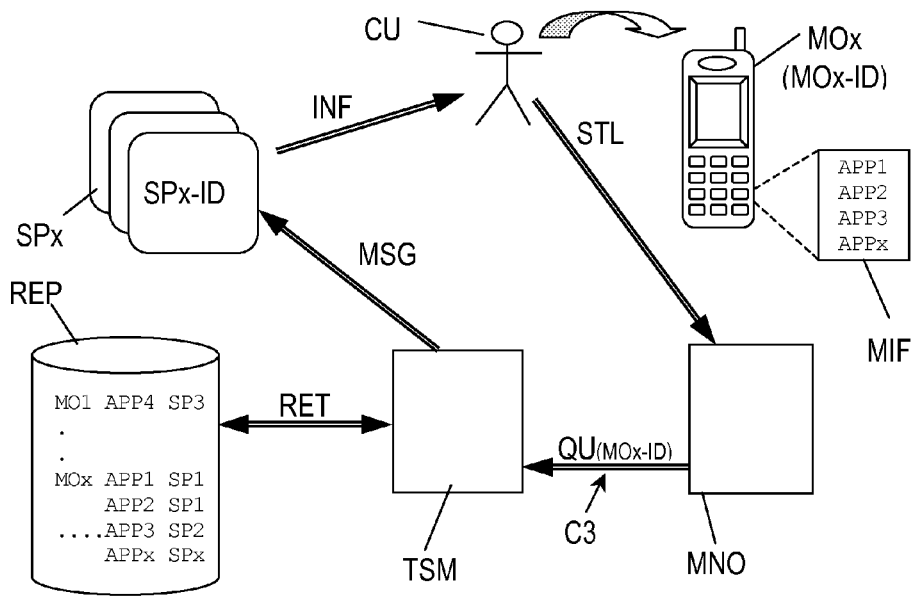
FIG. 6 shows a process flow in the mobile NFC ecosystem according to a second embodiment of the invention.

FIG. 6 shows another embodiment of the invention that is closely related to the first embodiment that has been described above, with the main difference that the Trusted Service Manager TSM when having retrieved (RET) the Service Providers SPx associated with the mobile communication device MOx and its mobile communication device identifier MOx-ID, respectively, does not generate and return a list of them to the Mobile Network Operator MNO, but contacts (MSG) directly the concerned Service Providers SPx in order to warn them about the lost/stolen mobile communication device MOx.

Figure 7:
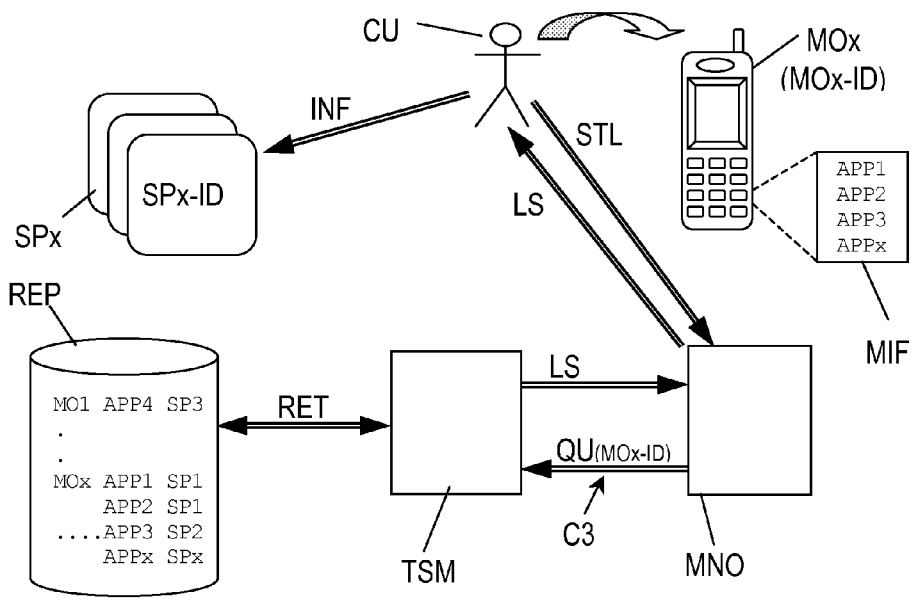
FIG. 7 shows a process flow in the mobile NFC ecosystem according to a third embodiment of the invention.

FIG. 7 shows a third embodiment of the present invention. When the customer CU has realized that his mobile communication device MOx has been lost or stolen he sends a report STL (by telephone, e-mail or whatsoever) of his loss to the Mobile Network Operator MNO. The Mobile Network Operator MNO reacts to this report by sending a query QU via a third communication channel C3 to the Trusted Service Manager TSM including in this query QU the identifier MOx-ID of the lost mobile communication device MOx. The query QU asks the Trusted Service Manager TSM for all Service Providers SPx that have been associated with the lost mobile communication device MOx and its mobile communication device identifier MOx-ID, respectively. The Trusted Service Manager TSM processes this query QU by retrieving (RET) from its repository REP all Service Providers SPx that are associated with the queried mobile communication device MOx and its mobile communication device identifier MOx-ID, respectively. Next, the Trusted Service Manager TSM replies to the query QU by sending a complete list LS of the retrieved Service Providers SPx to the Mobile Network Operator MNO. In the present embodiment of the invention the Mobile Network Operator MNO forwards this list LS of the retrieved Service Providers SPx to the customer CU. The customer CU is now in a position to decide whether he should contact (INF) the concerned Service Providers SPx to warn them about the lost/stolen mobile communication device MOx so that actions can be taken on the registration of the customer CU with the Service Providers SPx. Actions could be cancellation, report on an other mobile telephone, freeze of the registration and so on.

Figure 8:
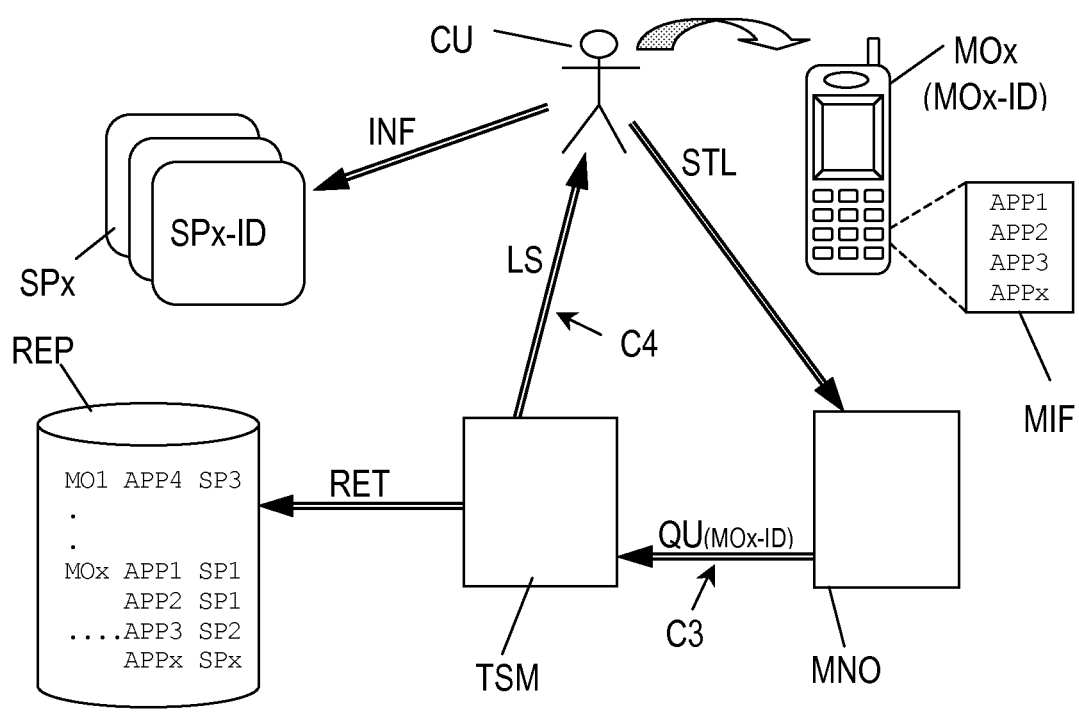
FIG. 8 shows a process flow in the mobile NFC ecosystem according to a fourth embodiment of the invention.

FIG. 8 shows another embodiment of the invention that is closely related to the third embodiment that has been described above, with the main difference that the Trusted Service Manager TSM when having retrieved the Service Providers SPx associated with the mobile communication device identifier MOx-ID generates a list LS of them and forwards this list LS directly to the customer CU of the mobile communication device MOx via a fourth communication channel C4, rather than returning the list to the Mobile Network Operator MNO. If necessary the Mobile Network Operator MNO when sending the query QU to the Trusted Service Manager TSM also sends details about the fourth communication channel C4 to be used by the Trusted Service Manager TSM.

The invention claimed is:

1. A Trusted Service Manager being configured:
   to receive installation requests from Service Providers via a first communication channel, said installation requests including an application, a Service Provider identifier of the Service Provider and a unique identifier of a target mobile communication device, the target mobile communication device being equipped with a memory device to store the application;
   to transmit the application comprised within the installation request via a second communication channel, to the target mobile communication device;

to keep a repository of information regarding the applications for which installation requests have been received, their associated service provider identifiers and their associated target mobile communication device identifiers;

to receive a query from a Mobile Network Operator via a third communication channel, the query requesting the Service Providers associated with a specific mobile communication device identifier; and to process said query by retrieving from the repository those Service Providers that are associated with the queried mobile communication device identifier.

2. The Trusted Service Manager as claimed in claim 1, being configured to forward a list of the retrieved Service Providers to the Mobile Network Operator having sent the query.

3. The Trusted Service Manager as claimed in claim 1, being configured to send a message comprising the queried mobile communication device identifier with all the retrieved Service Providers.

4. The Trusted Service Manager as claimed in claim 1, being configured to forward a list of all the retrieved Service Providers to the customer of the mobile communication device via a fourth communication channel.

5. The Trusted Service Manager as claimed in claim 4 wherein at least one of the first communication channel, the third communication channel and/or the fourth communication channel includes a computer network.

6. The Trusted Service Manager as claimed in claim 5, wherein a data transmission protocol used in the computer network includes HTTPS.

7. The Trusted Service Manager as claimed in claim 1, wherein the second communication channel includes an Over-The-Air channel.

8. The Trusted Service Manager as claimed in claim 1, wherein the unique identifier of a target mobile communication device includes a telephone number.

9. The Trusted Service Manager as claimed in claim 1, wherein the memory device includes a smart card.

10. The Trusted Service Manager as claimed in claim 1, wherein the memory device includes a Mifare device.

* * * * *